(12) United States Patent
Gutjahr et al.

(10) Patent No.: US 10,752,162 B2
(45) Date of Patent: Aug. 25, 2020

(54) HEADLIGHT SYSTEM AND METHOD FOR PROVIDING A BENDING LIGHT FUNCTION

(71) Applicant: VOLKSWAGEN AKTIENGESELLSCHAFT, Wolfsburg (DE)

(72) Inventors: Karl-Wilhelm Gutjahr, Berlin (DE); Alexander Thiel, Braunschweig (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 0 days.

(21) Appl. No.: 16/070,338

(22) PCT Filed: Dec. 13, 2016

(86) PCT No.: PCT/EP2016/080733
§ 371 (c)(1),
(2) Date: Jul. 16, 2018

(87) PCT Pub. No.: WO2017/121560
PCT Pub. Date: Jul. 20, 2017

(65) Prior Publication Data
US 2019/0031086 A1 Jan. 31, 2019

(30) Foreign Application Priority Data
Jan. 14, 2016 (DE) .......... 10 2016 200 339

(51) Int. Cl.
*B60Q 1/12* (2006.01)
*F21S 41/663* (2018.01)
(Continued)

(52) U.S. Cl.
CPC ............ *B60Q 1/122* (2013.01); *F21S 41/141* (2018.01); *F21S 41/663* (2018.01);
(Continued)

(58) Field of Classification Search
CPC ...... B60Q 1/122; F21S 41/663; F21S 41/141; F21S 41/675
See application file for complete search history.

(56) References Cited

U.S. PATENT DOCUMENTS 8,292,481 B2 10/2012 Goetz et al.
8,801,242 B2 8/2014 Hamm et al.
(Continued)

FOREIGN PATENT DOCUMENTS

DE 102004055882 A1 6/2006
DE 102005041234 A1 3/2007
(Continued)

OTHER PUBLICATIONS

Machine Translation of JP 2010095205 (Year: 2010).*

*Primary Examiner* — Leah Simone Macchiarolo
(74) *Attorney, Agent, or Firm* — Laurence A. Greenberg; Werner H. Stemer; Ralph E. Locher

(57) ABSTRACT

A headlight system for a vehicle is enabled for a bending light function. A first light module generates a conventional asymmetrical dipped headlight with an upper first light/dark boundary on the driver's side of a central axis. A second light module has a matrix of light-emitting diode units. A control unit actuates light emissions of the individual light-emitting diode units separately. A bend-detection unit detects the radius of a curve in the direction of travel of the vehicle. The light-emitting diode units have at maximum two horizontal lines, and they generate an emission characteristic with a lower second light/dark boundary below the first light/dark boundary of the dipped headlight, an upper third light/dark boundary above the first light/dark boundary of the dipped headlight, and a lateral fourth light/dark boundary on the side of the light emissions of the second light module the faces the driver's side.

9 Claims, 8 Drawing Sheets

(51) Int. Cl.
*F21S 41/141* (2018.01)
*F21Y 103/10* (2016.01)
*F21Y 105/16* (2016.01)
*F21Y 115/10* (2016.01)
*F21W 102/13* (2018.01)

(52) U.S. Cl.
CPC ... *B60Q 2300/322* (2013.01); *F21W 2102/13* (2018.01); *F21Y 2103/10* (2016.08); *F21Y 2105/16* (2016.08); *F21Y 2115/10* (2016.08)

(56) References Cited

U.S. PATENT DOCUMENTS

| | | | |
|---|---|---|---|
| 9,243,773 B2 | 1/2016 | Funk et al. | |
| 9,688,184 B2 | 6/2017 | Kataike | |
| 9,890,918 B2 | 2/2018 | Singer et al. | |
| 2008/0239746 A1 | 10/2008 | Wuller et al. | |
| 2012/0127712 A1* | 5/2012 | Komatsu | F21V 7/0025 362/235 |
| 2014/0029279 A1* | 1/2014 | Suckling | F21S 41/16 362/510 |
| 2014/0029289 A1 | 1/2014 | Mochizuki et al. | |
| 2015/0204502 A1 | 7/2015 | Kleinkes et al. | |
| 2016/0069527 A1 | 3/2016 | Komatsu | |
| 2019/0120457 A1* | 4/2019 | Alisafaee | F21S 41/663 |
| 2019/0145600 A1* | 5/2019 | Spinger | G02B 19/0066 |
| 2019/0195453 A1* | 6/2019 | Sakamoto | F21S 41/275 |

FOREIGN PATENT DOCUMENTS

| | | |
|---|---|---|
| DE | 102006039182 A1 | 3/2008 |
| DE | 102007052745 A1 | 5/2009 |
| DE | 102008036193 A1 | 2/2010 |
| DE | 102011077636 A1 | 11/2011 |
| DE | 202011103805 U1 | 11/2011 |
| DE | 102011011101 A1 | 8/2012 |
| DE | 102012103313 A1 | 10/2013 |
| DE | 102012112994 A1 | 6/2014 |
| DE | 102015224161 A1 | 6/2016 |
| EP | 2085688 A2 | 8/2009 |
| EP | 2501206 A1 | 9/2012 |
| EP | 2548768 A2 | 1/2013 |
| EP | 2818793 A2 | 12/2014 |
| JP | 2010095205 A | 4/2010 |
| KR | 20140111733 A | 9/2014 |

* cited by examiner

HEADLIGHT SYSTEM AND METHOD FOR PROVIDING A BENDING LIGHT FUNCTION

BACKGROUND OF THE INVENTION

Field of the Invention

The present invention relates to a headlight system for a vehicle for providing a bending light function. The headlight system comprises a first light module having a first light source and an optical unit. The first light module is configured to generate an asymmetrical low beam, wherein the asymmetrical low beam on the driver side of a central axis has an upper first light-dark boundary that is oriented horizontally. The headlight system further comprises a second light module, which comprises a plurality of light-emitting diode (LED) units arranged in the manner of a matrix. The headlight system also comprises a control unit, which is coupled to at least the second light module and is designed to separately control the light emission of the individual LED units of the second light module. Finally, the headlight system comprises a bend detection unit coupled to the control unit, which enables detection of the radius of a curve in the direction of travel of the vehicle. The invention also relates to a method for providing a bending light function.

The headlight system of a vehicle has the purpose of illuminating the environment in front of the vehicle in the direction of travel, in particular the roadway, in poor visibility conditions, particularly in the dark. In addition, the light emission from the headlight system serves as a distinguishing feature for other road users.

Headlight systems for providing various light functions are known in the art. Conventionally, the headlight system may produce a radiation characteristic for a low beam function and a high beam function. The driver may manually control these light functions. However, automatic control of these light functions is also known in the art. For example, other road users around the vehicle may be detected, and it is possible to automatically switch back and forth between the low beam function and high beam function depending on whether such road users are detected. Headlight systems that provide a bending light function are also known in the art. For a bending light function, the radiation characteristic is changed in such a way that it is pivoted at least horizontally toward the curve in the direction of travel, in order to better illuminate the roadway in the curve in front of the vehicle.

From DE 10 2006 039 182 A1, for example, an adaptive bending light is known. The light module of this headlight system comprises a plurality of LED segments. These LED segments emit light in different radiation directions. By means of a control device, the size and direction of the solid angle within which light is radiated are changed by varying the radiation intensity emitted by two or more LED segments, as a function of the driving parameters that characterize a driving situation. The luminous flux emitted by the LED segments is regulated in particular by means of a pulse width modulation of the supply current. Further, the width of the total light distribution is controlled by brightness adjustments of the individual LED segments.

From DE 10 2011 077 636 A1, a light module of a motor vehicle for generating a spot distribution of a high-beam light distribution is known. In this case, the spot distribution is superimposed on a base distribution generated by a separate light module. By mechanically pivoting the light module in the horizontal direction, a bending light function may be provided.

Finally, from DE 10 2008 036 193 A1, a headlight system for a motor vehicle is known which has a first light module for generating a low beam base distribution and a second light module for generating a high beam base distribution. Additionally, the headlight system has a third light module with an LED array with individually controllable LEDs for generating a third light distribution. With the third light module, through targeted activation of the individual LEDs, a variable spot may be generated, with which the base light distributions of the first two light modules may be supplemented. By means of the third light distribution, a complete asymmetrical low beam may be provided in conjunction with the low beam base distribution generated by the first light module. Furthermore, the center of gravity, that is to say the brightness maximum for the third light distribution and thus also for the total light distribution, may be shifted in such way that a bending light function may be provided.

In headlight systems with a bending light function, it is necessary to provide this functionality as cost-effectively as possible. Matrix headlights with high-performance LEDs are known, which make possible both low-beam and high-beam functions, as well as a bending light function. But such matrix headlights are very expensive. More cost-effective solutions complement conventional headlights for the low beam function with light modules that provide the bending light function. However, the problem remains that such headlight systems require a relatively large amount of space. With regard to vehicle aerodynamics and design, however, it is desirable that the lighting components should require very little space and that the headlight system on the outer surface of the vehicle should occupy as small an area as possible. In the case of a bending light function, there is the additional problem that pivoting of the light cone in the direction of the curve may cause other parts of the vehicle body to shade the light cone.

SUMMARY OF THE INVENTION

The present invention therefore has the objective of providing a headlight system and method of the aforementioned type, which may be produced or implemented inexpensively and requires little space in the vehicle.

The invention achieves this objective through a headlight system having the features as claimed and a method as claimed. Advantageous embodiments and further developments of this headlight system and method are specified in the dependent claims.

The headlight system of the invention is characterized in that the LED units of the second light module, which are arranged in the manner of a matrix, have at most two horizontal lines. Furthermore, in the headlight system of the invention, by means of the light emission of the LED units, a radiation characteristic may be generated having a lower second light-dark boundary, which is below the first light-dark boundary of the low beam, an upper third light-dark boundary, which is above the first light-dark boundary of the low beam, and a lateral fourth light-dark boundary on the side of the light emission of the second light module facing the driver side. Further, in the headlight system of the invention for providing a bending light function, the control unit, bend detection unit and second light module are configured in such a way that the outermost one of the light beams of the light emission of the LED units, which generates the lateral fourth light-dark boundary that encloses the longitudinal axis of the vehicle in the horizontal direction, generates a variable bending light angle; and in such a way that this bending light angle varies with the radius of the curve that the curve detection unit detects.

Herein a "light-dark boundary" refers to a line of a light distribution, with a clearly visible change in illuminance at the light-dark boundary. In determining the position of the light-dark boundary, a vertically oriented measurement screen is viewed 25 m from the light source, with the optical axis oriented horizontally through the focal point of the associated headlight or light module and perpendicularly to an origin point of the screen. This results in a horizontal plane passing through both the focal point of the headlight or light module and the origin point of the measurement screen, as well as a vertical plane which likewise passes through the focal point of the headlight or light module and the origin point of the screen. In this case, for example, the position of the light-dark boundary may be defined in such a way that, in the case of a vertical cut at a constant angle, the light-dark boundary lies at the inflection point of the logarithmic illuminance curve of the light distribution. Due to the position of the light-dark boundary, the setting and orientation of a headlight or light module may be unambiguously defined.

The "driver side" is defined herein to be, in right-hand traffic, the left side of a central axis passing through the focal point of the first light module, so that the passenger side lies on the right side of this central axis. Conversely, in left-hand traffic, the driver side is on the right side of the central axis and the passenger side is on the left side of the central axis. The central axis thus also intersects the origin point of the measurement screen.

The headlight system of the invention thus comprises a first light module that may completely generate the asymmetrical low beam. This means that on the driver side of the central axis, an upper light-dark boundary is formed that is horizontally oriented. Notably, the horizontal orientation may be within certain tolerance ranges. When setting this horizontally oriented light-dark boundary, the light module is usually set in the vertical direction in such a way that an initially downward-inclined light beam is raised so that it is in its desired position, 1% (25 cm at the measurement screen) below the horizontal plane which intersects the focal point of the light module. In the vertical plane, which intersects the focal point of the light module, there then results a bend on the passenger side, which rises toward the passenger side. This bend usually encloses a 15° angle with the horizontal. However, other angles are possible for this bend. The light-dark boundary then continues to rise on the passenger side until it is above the horizontal plane and then flattens off, so that again a substantially horizontally oriented light-dark boundary is formed on the passenger side that is higher than the upper first light-dark boundary on the driver side.

In the headlight system of the invention, a first light module for an asymmetrical low beam, which is already provided in the vehicle, is advantageously combined with a second light module with LED units arranged in the manner of a matrix, so that the space requirement for the second light module is very small, but the asymmetrical low beam of the first light module may be supplemented so as to provide a bending light function. For this purpose it is sufficient for the second light module to have at most two horizontal lines with LED units. The second light module may thus be designed in particular to have a slot-like shape. Due to the geometrical arrangement of the second and third light-dark boundaries of the radiation characteristic of the second light module, which are below and above the light-dark boundary of the low beam, the asymmetrical low beam may be complemented very efficiently for the bending light function. Advantageously for this purpose, the lower second light-dark boundary of the radiation characteristic of the second light module and/or the upper third light-dark boundary of this radiation characteristic is also oriented horizontally. The two light-dark boundaries thus run substantially parallel to the first light-dark boundary on the driver side of the asymmetrical low beam. By means of the lateral fourth light-dark boundary of the light emission of the second light module, the bending light function may now be provided by pivoting this lateral light-dark boundary in the horizontal direction, relative to its angle with the vehicle longitudinal axis, as a function of the radius of the curve.

In an initial position, the lateral fourth light-dark boundary of the light emission of the second light module lies in particular in the region of the rising part of the bend of the asymmetrical low beam, so that illumination by the second light module is improved on the passenger side, i.e. on the right in right-hand traffic. In the case of a curve toward the driver side, that is, in a left-hand bend in right-hand traffic, in which the conventional asymmetrical low beam provides insufficient illumination of the roadway, the lateral fourth light-dark boundary of the light emission of the second light module may now be pivoted to the driver side, so as to provide better illumination of the curve. In this way, the bend of the asymmetrical low beam may be displaced toward the driver side to provide the bending light function.

The lateral fourth light-dark boundary of the light emission of the second light module may be oriented vertically or obliquely, in particular at a 15° angle to the horizontal. On the measurement screen, this boundary connects the lower second light-dark boundary and the upper third light-dark boundary of the light emission of the second light module.

The LED units of the second light module may comprise only one LED or a plurality of LEDs. For each LED unit, by means of the control unit, a light emission is generated with a defined, variable light intensity, which is radiated in a limited solid angle. The light emission of an LED unit is thus homogeneous but variable.

Herein, a horizontal line of matrically arranged LED units denotes a plurality of LED units arranged side by side in the horizontal direction. In particular, no variable illuminances may be generated in the vertical direction by means of a horizontal line. An LED unit in particular illuminates a specific segment of the radiation characteristic of the light emission of the second light module with overall variable but homogeneous illuminance. The superimposition of the illuminances generated by the LED units of the horizontal line yields the light distribution of this horizontal line of the second light module. The light distributions generated by the LED units may overlap in the horizontal direction; as a result, fluctuations of light intensity may occur in the horizontal direction. However, the segments illuminated by the LED units are, in particular, laterally next to each other, so that in each case the upper and lower light-dark boundary of a segment adjoins the respective light-dark boundary of an adjacent segment, and in this way the lower second light-dark boundary and the upper third light-dark boundary of the light emission of the second light module are formed.

By means of the bend detection unit of the headlight system of the invention, for example, the radius of a curve in the direction of travel in front of the vehicle may be detected prospectively, even if the vehicle is not yet traversing the curve. For this purpose, the bend detection unit may access, for example, data from the navigation system or a camera in order to obtain data about the curve to be traversed in the future, in particular in order to detect the curve radius.

Advantageously, the radius is detected at a defined distance in front of the vehicle. The bending light angle is then determined as a function of this radius.

Alternatively or additionally, the radius of the curve just traversed may be detected. In this case, the bend detection unit may access data from sensors of the vehicle, such as sensors for lateral acceleration, steering angle, and/or vehicle speed. Based on this data, the bend detection unit may determine the radius of the curve that is currently being traversed. The bending light angle is then determined as a function of this radius.

The "bending light angle" herein refers to the angle enclosed by one of the light beams, in particular the outermost beam, which is radiated toward the lateral fourth light-dark boundary of the light emission of the second light module, together with the vehicle longitudinal axis. In the case of a curve toward the driver side, the bending light angle increases toward the driver side of the vehicle, i.e. in the negative direction of a coordinate system of the measurement screen. In the case of a curve toward the passenger side, the bending light angle increases toward the passenger side of the vehicle, i.e. in the positive direction of a coordinate system of the measurement screen.

According to one embodiment of the headlight system of the invention, the matrically arranged LED units of the second light module have exactly one horizontal line. This advantageously brings about an especially small space requirement for the headlight system, because the second light module may be designed as a narrow slot having only one horizontal line. At the same time the headlight system is also inexpensive to produce, because a conventional first light module for the asymmetrical low beam is relied on.

According to another embodiment, exactly one horizontal line of the matrically arranged LED units of the second light module may provide the bending light function, and a further horizontal line of the matrically arranged LED units may provide a high-beam function. Advantageously, as a result, the functional scope of the headlight system of the invention is expanded, while the space requirement remains relatively small.

According to an embodiment of the headlight system of the invention, the first light module may be a projection or reflection headlight. The light source of the first light module is in particular a gas discharge lamp or a halogen lamp. According to another embodiment of the headlight system of the invention, the first light source of the first light module is an LED or comprises a plurality of LEDs. In this case too, however, the LEDs or LED of the first light module generate the complete asymmetrical low beam, whereas the LEDs of the second light module supplement the LEDs of the first light module, so that a bending light may be provided. Although LEDs provide the light source of the first light module, the space requirement of the headlight system is even lower than it is when a halogen bulb or gas discharge lamp provides this light source. However, in this case, the costs of producing the headlight system also increase.

In the method of the invention for providing a bending light function, a first light module generates an asymmetrical low beam that has an upper light-dark boundary on the driver side of a central axis which is oriented horizontally. Furthermore, the method detects the radius of a curve in the direction of travel of the vehicle. A second light module comprising a plurality of matrically arranged LED units with at most two horizontal lines is controlled in such a way that the light emission of the LED units produces a radiation characteristic with a lower second light-dark boundary that is below the first light-dark boundary of the low beam, an upper third light-dark boundary that is above the first light-dark boundary of the low beam, and a lateral fourth light-dark boundary on the side of the light emission of the second light module facing the driver side. To provide the bending light function, a bending light angle is varied, which is enclosed by the outermost of the light beams of the light emission of the LED units, which generates the lateral fourth light-dark boundary, together with the vehicle longitudinal axis in the horizontal direction; the bending light angle varies with the radius of the detected curve.

The method of the invention may be practiced in particular with the above-described headlight system. It therefore also has the same advantages as the above-described headlight system.

Considering the above-described measurement screen for defining the light distribution resulting from the light emission of the first and second light modules, the vertical extension is the light emission of the second light module, i.e. the vertical angle between light beams that form the lower second and upper third light-dark boundary, respectively, in a range of 2° to 3°. In this case, the upper third light-dark boundary of the light emission of the second light module is 1° to 2°, in particular 1.5°, above the first upper light-dark boundary on the driver side of the low beam. The lower second light-dark boundary of the light emission of the second light module is 0° to 3°, in particular 1° to 3°, below the upper first light-dark boundary on the driver side of the low beam, in particular 1.75° below this light-dark boundary of the low beam. In this case, the upper first horizontally oriented light-dark boundary on the driver side of the low beam is usually at approximately −0.5° (in particular at −0.57°) relative to the horizontal plane passing through the focal point of the first light module. The lower second light-dark boundary of the light emission of the second light module is in this case in particular at −2.25°, and the upper third light-dark boundary of the light emission of the second light module is at +1°.

The lateral fourth light-dark boundary on the side of the light emission of the second light module facing the driver side may enclose an angle with the horizontal plane in a range from 90° to 10°; this lateral fourth light-dark boundary is inclined in the same direction as the bend of the asymmetrical low beam on the passenger side. The mid-point of the lateral fourth light-dark boundary in the horizontal direction is located in particular in a range of 20% to 30% of the horizontal extent of the rise of the light-dark boundary after the bend of the asymmetrical low beam until the transition to a horizontal light-dark boundary on the passenger side of the vehicle, if no current or upcoming cornering has been detected. This advantageously results in a smooth transition from the light distribution generated by the second light module to the light distribution of the asymmetrical low beam in straight-line travel.

In one embodiment of the method of the invention, the LED units of the second light module are controlled in such a way that segments are illuminated with different light intensities in the horizontal direction. In this case, the horizontal angle of the segments increases from the side facing the driver side to the opposite side, i.e. from the outside toward the passenger side. Further, the horizontal angle of the segments in the middle may be the lowest, and the horizontal angle of the segments increases toward the outside. Thus, in straight-line travel and/or when cornering, the inner segments are narrower than the outer segments. The narrower inner segments make it possible to achieve a finer gradation of the light distribution in the vertical fourth light-dark boundary, the angular position of which is changed in the bending light function, than may be achieved in the outer areas, which are substantially completely superimposed on the light distribution of the asymmetrical low beam.

To generate the segments, the LED units of the second light module are in particular controlled in such a way that the light intensity emitted by an LED unit differs from the light intensities emitted by adjacent LED units.

The horizontal angle of the inner segments may be for example in a range of 0.5° to 3°, in particular 1° to 2°. The horizontal angle of the outer segments, however, may be in a range of 5° to 20°, in particular 6° to 10°.

According to a further embodiment of the method of the invention, as already explained above, the LED units of the second light module are controlled in such a way that segments with different light intensities are formed in the horizontal direction. Alternatively or additionally, in this case, the light intensity of the segments decreases from the side facing the driver side toward the opposite side, from the outside inward. In this case, therefore, it is not (only) the horizontal angle of the segments that varies, but (also) the light intensity of the segments, so that the light intensity e.g. decreases moving outward from the inside. In this way, the illuminances of the segments arranged in the vicinity of the vertical lateral fourth light-dark boundary are particularly high, so that the effect of the bending light function on the roadway is very clearly visible to the driver. As a result, the illuminance is advantageously increased precisely in this region of the roadway that is essential for turning.

According to a further embodiment of the method of the invention, the LED units of the second light module are controlled in such a way, dependent on the radius of the detected curve, that a light intensity profile results in the horizontal direction, in which the light intensity is maximum in a segment or horizontal angle range and the light intensity is lower in adjacent segments or horizontal angle ranges. In this case, the horizontal angle, i.e. width of the segment or horizontal angle range with maximum light intensity, increases when the bending light angle increases. In this case, this increase in the horizontal angle of the segment with maximum light intensity may not be achieved, in particular, by a change in the radiation of the LED units, but by another LED unit, which illuminates a segment with a different horizontal angle, providing the segment that has the maximum light intensity.

The light intensities emitted by the LED units of the second light module have a certain intensity profile in the horizontal direction. The light intensity is maximum in a certain horizontal angle range, i.e. in a specific segment in particular. The horizontal angle accordingly defines the size of the region of maximum light intensity. Furthermore, a maximum angle may be defined that the bisector of the horizontal angle range or of the segment encloses together with the vehicle longitudinal axis. This maximum angle defines the horizontal angular position of the region of maximum light intensity relative to the vehicle's longitudinal axis. This maximum angle may also be dependent on the radius of the detected curve, in particular if the region of maximum light intensity is not directly at the lateral fourth light-dark boundary of the light emission of the second light module. Preferably, the maximum angle is also pivoted toward the detected curve as a function of the radius of the curve.

It should be noted that the light emission direction of the second light module is not mechanically pivoted; rather, pivoting of the lateral fourth light-dark boundary or of the maximum angle is achieved by changing the light intensities the individual LED units emit. In this case, therefore, the horizontal widths of the segments that are illuminated by the individual LED units are not changed; only the illuminance levels in these segments are changed. When the lateral fourth light-dark boundary of the second light module is pivoted, segments which have not previously been illuminated are illuminated laterally next to the lateral fourth light-dark boundary, so that the lateral fourth light-dark boundary shifts toward the illuminated segment. At the same time, the intensity in, for example, the segment that previously formed the lateral fourth light-dark boundary may be reduced.

According to a preferred embodiment of the method of the invention, the LED units of the second light module are controlled in such a way that the lateral fourth light-dark boundary is formed by the horizontal angle range having maximum light intensity. As a result, the lateral fourth light-dark boundary, which determines the bending light function, is particularly clear and clearly recognizable on the roadway. According to a further embodiment of the method of the invention, when it has been detected that no curve is being traversed, the lateral fourth light-dark boundary point is in the region of the rise of the light-dark boundary of the asymmetrical low beam on the passenger side. In this case of straight-line travel, the light emission of the second light module thus amplifies the asymmetrical branch of the low beam on the passenger side.

According to a further embodiment of the method of the invention, the light-dark boundary of the asymmetrical low beam on the passenger side has a further horizontally oriented region, which is arranged above the first light-dark boundary on the driver side. In particular, the upper third light-dark boundary of the light emission of the second light module substantially coincides with the further horizontally oriented light-dark boundary on the passenger side of the asymmetrical low beam. In this way the light emission of the second light module blends harmoniously into the light emission of the asymmetrical low beam, so that a bending light function may be provided inexpensively with little additional illumination, for which the headlight system and method require little space.

The invention will now be explained with respect to an exemplary embodiment, with reference to the drawings.

DESCRIPTION OF THE INVENTION

Figure 1:
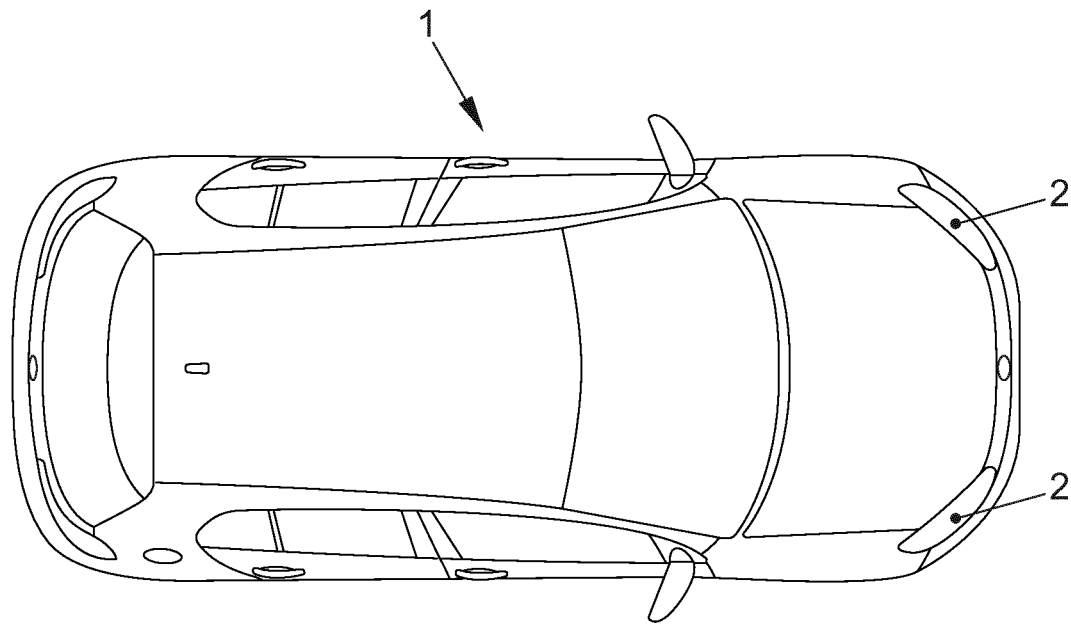
FIG. 1 shows a vehicle with an exemplary embodiment of the headlight system of the invention, FIG. 2 schematically depicts the structure of the exemplary embodiment of the headlight system of the invention.
Figure 2:
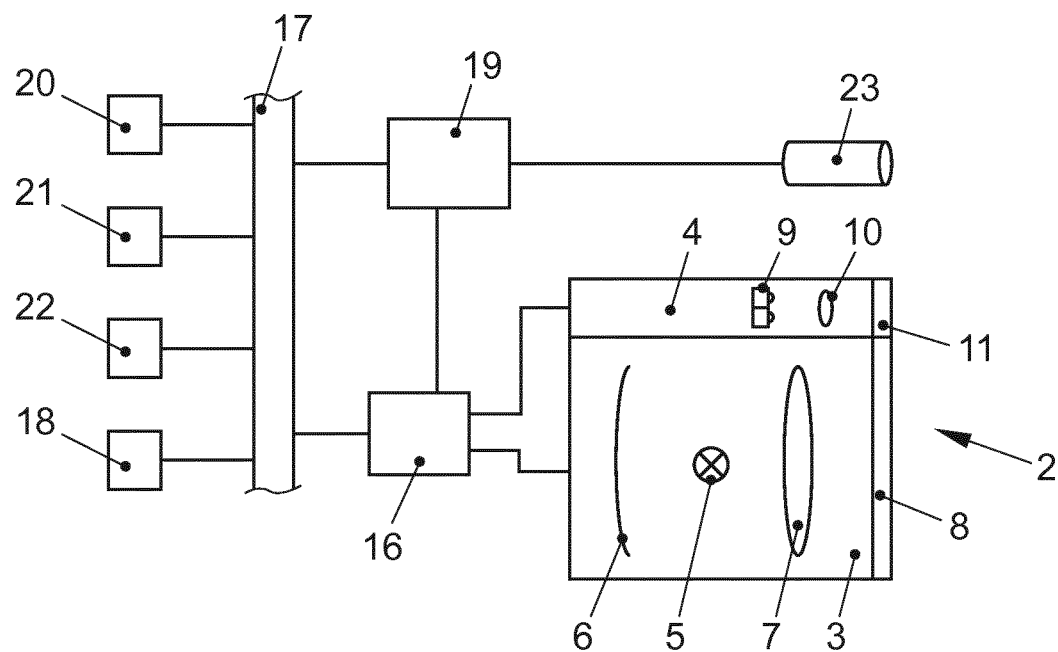

FIG. 1 shows a plan view of a vehicle 1 comprising the headlight system 2 according to the invention. FIG. 2 shows the structure of this headlight system 2 schematically.

The headlight system 2 has a first light module 3. This relates to a known reflection or projection headlight having a light source 5, a reflector 6, a projection lens 7 and a light cover lens 8. The light source 5 may be, for example, a halogen lamp or gas discharge lamp. Furthermore, the light source 5 may also be an LED or LED array.

A second light module 4 is arranged immediately above the first light module 3. It is formed in a slot-like shape and has a very low height. In the width direction, the second light module 4 is adapted to the width of the first light module 3. The second light module 4 comprises an LED matrix 9 and, if necessary for the radiation characteristic, an optical element 10 and a light cover lens 11.

Figure 3:
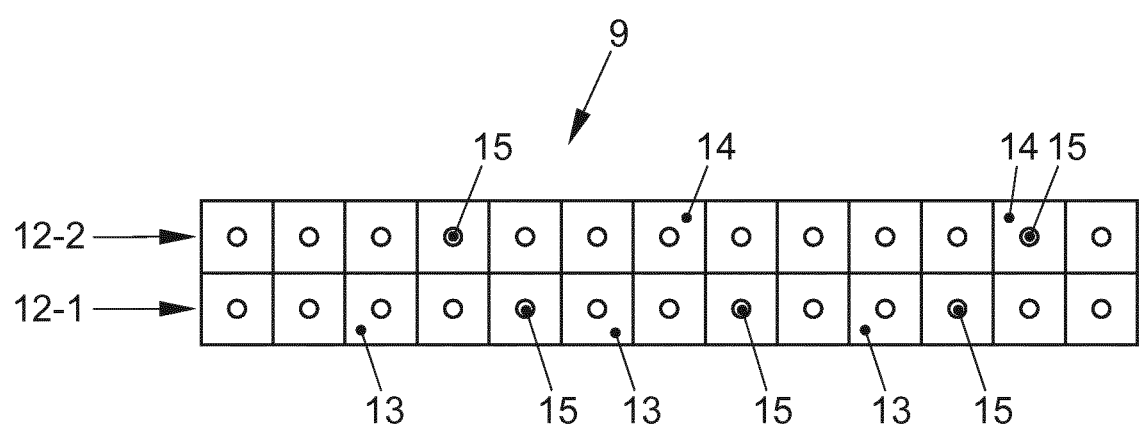
FIG. 3 shows a front view of the LED matrix of the second light module.

The LED matrix 9 is shown in detail in FIG. 3. It comprises a plurality of matrically arranged LED units 13 and 14. The LED units 13 and 14 each comprise one or a plurality of LEDs 15. The LED units 13 are arranged in a first lower horizontal line 12-1; the LED units 14 are arranged in a second upper horizontal line 12-2. The LED units 13 or 14 are respectively positioned next to one another in a horizontally oriented row. Overall, the space requirement of the LED matrix 9 in the height direction is very low, so that the matrix may be integrated into the slot-like second light module 4.

In the present exemplary embodiment, each of the horizontal lines 12-1 and 12-2 has thirteen LED units 13 or 14. From each LED unit 13, a segment is generated for a dynamically adaptable bending light, as explained later. From the LED units 14 of the second horizontal line 12-2, a high beam function may be generated. It should be noted that the LED array 9 has at most two horizontal lines, so that the space requirement is minimized in the vertical direction. However, it would also be possible for both horizontal lines 12-1 and 12-2 to provide shared segments for a dynamic bending light function.

Referring again to FIG. 2, the first light module 3 and second light module 4 are coupled to a control unit 16. The control unit 16 controls the light source 5 of the first light module 3 and the LED units 13 and 14 of the second light module 4 so that these may be switched on and off; in addition, the luminous flux emitted by these light sources may be controlled by these LED units 13 and 14, as explained later.

The control unit 16 is in turn coupled to a data bus 17 of the vehicle 1. A sensor 20 for the lateral acceleration of the vehicle 1, a sensor 21 for the steering angle of the vehicle 1, and a speed sensor 22, are connected to the data bus 17. The data recorded by these sensors 20 to 22 may be transmitted to the control unit 16. A navigation system 18 is also connected to the data bus 17. Also, data of this navigation system 18, comprising data on a geographical map including information on radii of curves of the roads, may be transmitted to the control unit 16.

A camera 23, which receives image data in the direction of travel of the vehicle 1 and transmits this data to a bend detection unit 19, is also integrated into the vehicle 1. By means of the bend detection unit 19, the roadway in the direction of travel of the vehicle 1 may be analyzed. The bend detection unit 19 may in particular determine whether the roadway in front of the vehicle 1 is straight, or whether there is a curve in the direction of travel. When a curve has been detected, the bend detection unit 19 may determine how large the radius of the oncoming curve is. Radii may be determined in particular for sections of the curve. In this case, the distance of this section from the vehicle 1 is determined for each radius. The data determined by the bend detection unit 19 may be transmitted to the data bus 17 and also to the control unit 16.

From the bend detection unit 19, the radius of the curve ahead of the vehicle 1 in the direction of travel may also be determined based on the data of the navigation system 18. Alternatively or additionally, the bend detection unit 19 may also determine the radius of the curve currently being traversed based on the data from sensors 20 to 22.

Figure 4:
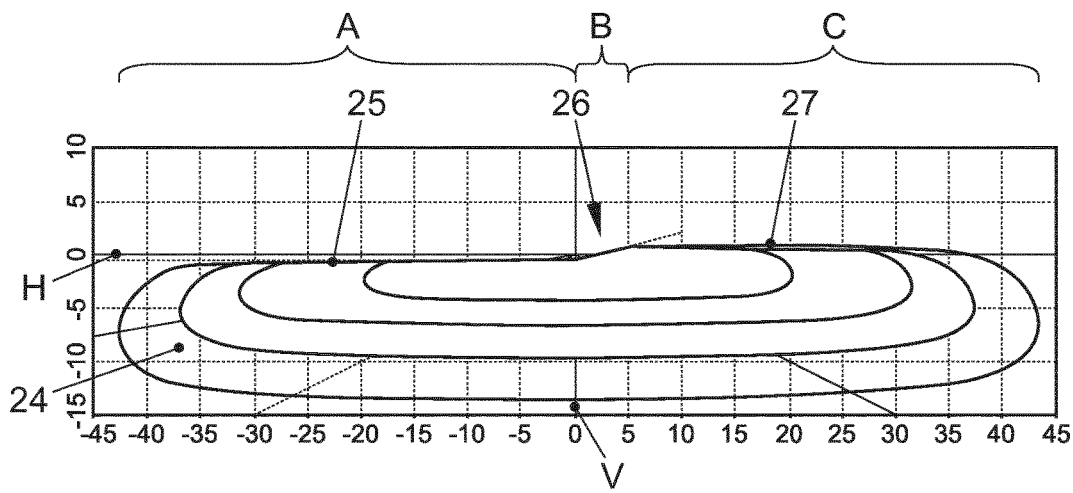
FIG. 4 shows the light distribution generated by the first light module.

The radiation characteristic of the light emission of the first light module 3 will be explained with reference to FIG. 4. FIG. 4 shows the radiation characteristic of the first light module 3 as an isolux diagram on a measurement screen. The measurement screen is located 25 m from the first light module 3, i.e. from the focal point of this first light module 3. The measurement screen is oriented perpendicular to the longitudinal axis of the vehicle 1; the origin point of the screen, where the horizontal H and vertical V intersect, is both vertically and horizontally at the position of the focal point of the first light module 3.

The light distribution 24 generated by the first light module 3 may be characterized by the profile of the light-dark boundary. On the driver side A of the vehicle 1, i.e. the left side in right-hand traffic, the upper light-dark boundary 25 of the light distribution 24 is oriented horizontally. The boundary is located approximately 0.5° below the horizontal H. In the vertical V, the light-dark boundary has a bend, so that in a transition region B at a horizontal angle of 0° to 5°, the light-dark boundary 26 rises (negative horizontal angles are on the driver side of the vertical V and positive horizontal angles are on the passenger side of the vertical V). The rising part of the light-dark boundary 26 usually encloses an angle of 15° with a horizontal plane. Following the transition region B, the light-dark boundary 27 on the passenger side C reverts to the horizontal, with the horizontally oriented light-dark boundary 27 located on the passenger side above the horizontally oriented light-dark boundary 25 on the driver side. The horizontally oriented light-dark boundary 27 on the passenger side, may be for example 1° above the horizontal H and thus 1.5° above the light-dark boundary 25. The light distribution 24 of the first light module 3 is thus a conventional asymmetrical low beam, which complies with the European standard ECE-R112 or ECE-R98 effective in 2015. If the light source 5 is an LED or an LED array, the asymmetrical low beam of European standard ECE-R123 effective in 2015 will suffice. The first light module 3 and the light distribution 24 generated by this light module are thus known.

Figure 5:
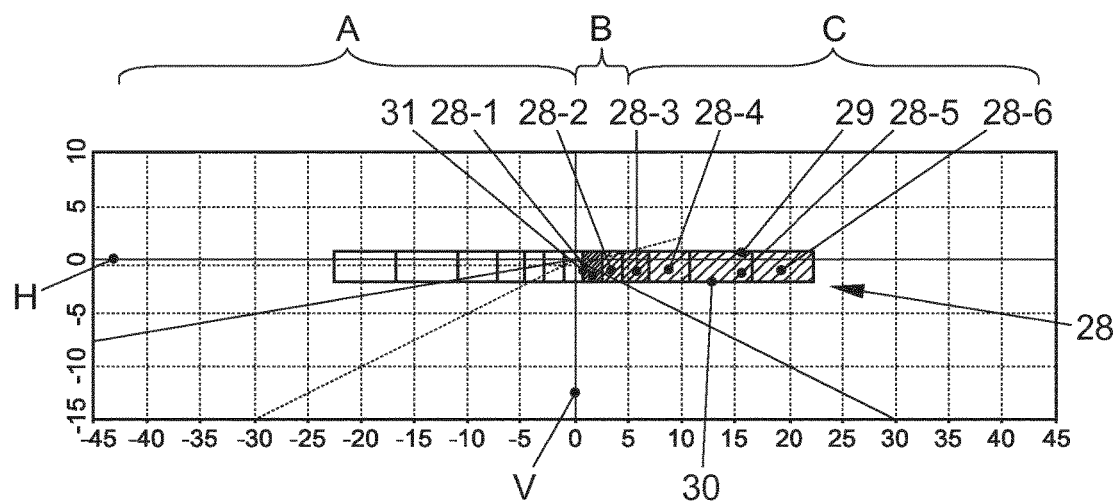
FIG. 5 shows the light distribution generated by the second light module.

FIG. 5 shows the radiation characteristic of the light distribution 28 of the second light module 4. The light distribution 28 is generated only by the LED units 13 of the horizontal line 12-1. The light distribution 28 is elongated in the horizontal direction. In an output light distribution for a grade exit, it comprises the illuminated segments 28-1 to 28-6. These six segments of the light distribution 28 are generated by the passenger-side six LED units 13, each LED unit 13 illuminating one of the segments 28-1 to 28-6. The illuminance within a segment is substantially homogeneous. However, the magnitude of the illuminance may be changed via the control unit 6. In the vertical direction, segments 28-1 to 28-6 have the same dimensions, so that they form an upper horizontal light-dark boundary 29 and a lower horizontal light-dark boundary 30.

The upper horizontal light-dark boundary 29 of the light distribution 28 of the second light module 4 is located +1° above the horizontal H, that is, +1.5° above the upper horizontal light-dark boundary 25 on the driver side of the low beam. The lower light-dark boundary 30 of the light distribution 28 of the second light module 4, which is also horizontally oriented, is arranged at an angle of −2.25° to the horizontal H, i.e. 1.75° below the light-dark boundary 25.

The segment 28-1 facing the driver side also forms a lateral light-dark boundary 31. This boundary is vertically oriented in the present exemplary embodiment. However, the boundary could also be obliquely oriented, for example enclosing an angle of 15° with the horizontal, as is the case with the bend of the asymmetrical low beam.

Segments 28-1 to 28-6 are rectangular in the present exemplary embodiment; segments 28-1 to 28-6 may differ with respect to their width, that is, in terms of their horizontal angle. It should be noted that the shape of segments 28-1 to 28-6 may also be designed differently, for example as a parallelogram. In the present exemplary embodiment, segments 28-1 and 28-2 are the narrowest segments, segment 28-3 is wider, segment 28-4 is even wider, and the outer two segments 28-5 and 28-6 are even wider. The horizontal angle of segments 28-1 to 28-6 thus increases toward the outside, that is, from the driver side segment 28-1 to the outermost passenger side segment 28-6. Furthermore, the illuminances within segments 28-1 to 28-6 differ, as will be described later in the discussion of the bending light function. In addition, by means of the further driver-side LED units 13 of the LED matrix 9, further segments may be illuminated next to segment 28-1 on the driver side, as will be explained later with reference to the bending light function.

Figure 6:
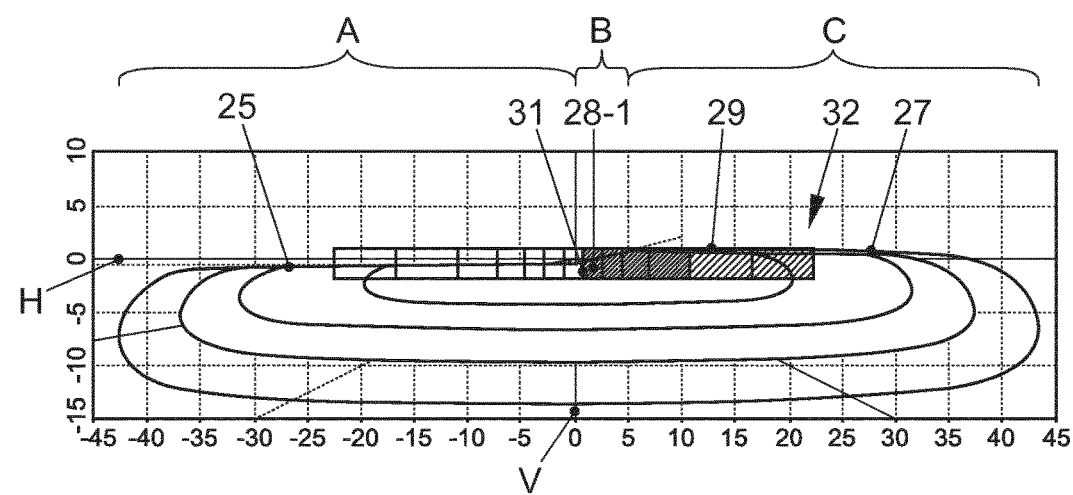
FIG. 6 shows the total light distribution produced by the first and second light modules.
Figure 7:
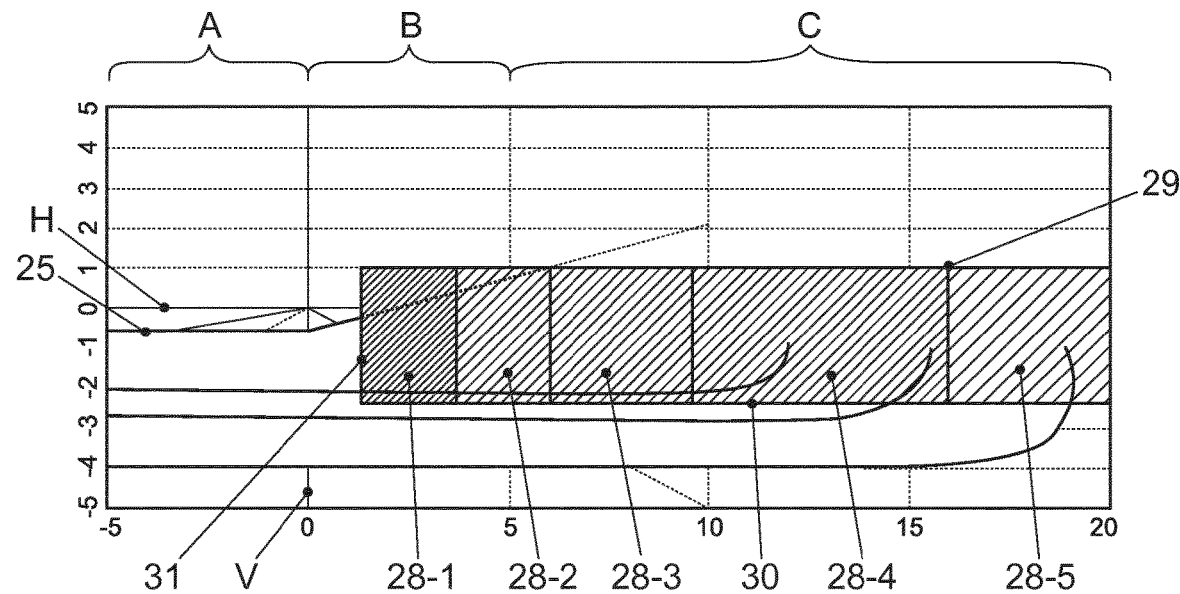
FIG. 7 shows a detailed view of the total light distribution shown in FIG. 6, FIG. 8 schematically depicts the geometry of the light rays emitted by the second light module.

FIG. 6 shows the total light distribution 32 that results from superimposing the light distribution 24 of the first light module and the light distribution 28 of the second light module 4. FIG. 7 shows a detailed view of this total light distribution 32. The lateral light-dark boundary 31 of the light distribution 28 of the second light module 4 is arranged in the transition region B at the rising light-dark boundary 26 of the light distribution 24 for the asymmetrical low beam. In the present exemplary embodiment, the vertically oriented light-dark boundary 31 is arranged at a horizontal angle of approximately +1.5° at approximately ⅓ of the rising light-dark boundary 26. The upper light-dark boundary 29 of the light distribution 28 of the second light module 4 essentially coincides with the upper light-dark boundary 27 of the light distribution 24 of the first light module 3 in the region C on the passenger side of the vehicle 1. The light distribution 28 thus complements the asymmetric branch of the asymmetrical low beam on the passenger side.

The total light distribution 32 shown in FIGS. 6 and 7 is an output light distribution that is generated by the control unit 16 when the vehicle 1 is traveling in a straight line. An example of the method of the invention for providing a bending light function will be described below, with reference to FIGS. 8 to 10. The method is carried out by means of the above-described example of the headlight system of the invention; further details of the embodiment of the system of the invention are set forth in the description of the method.

Figure 8:
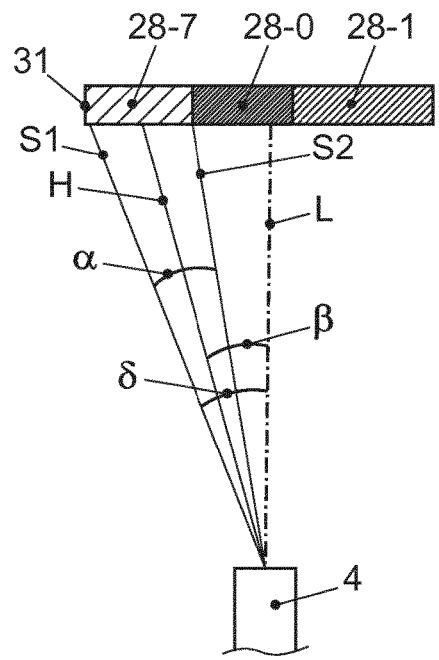
Figure 9A:
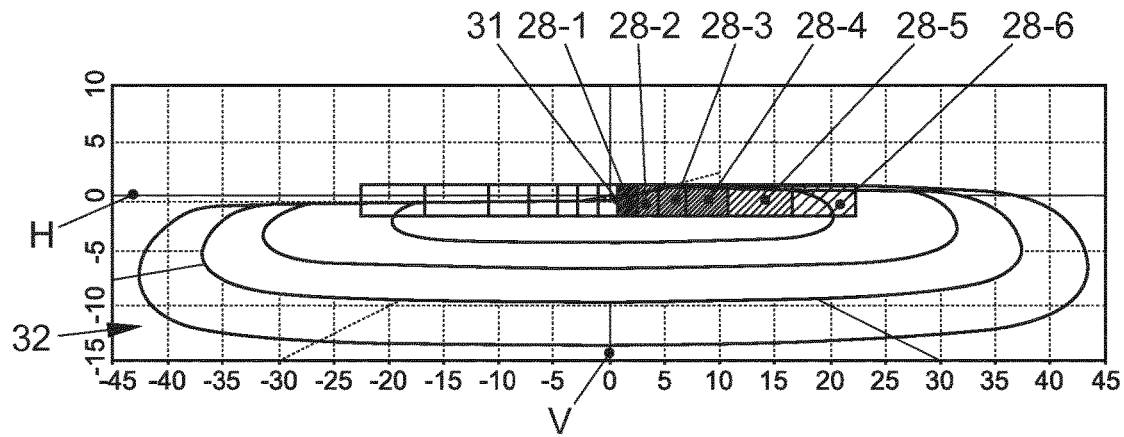
FIGS. 9A to 9E show light distributions of a bending light function in the case of a right-hand bend, which are generated by one embodiment of the method of the present invention.
Figure 9B:
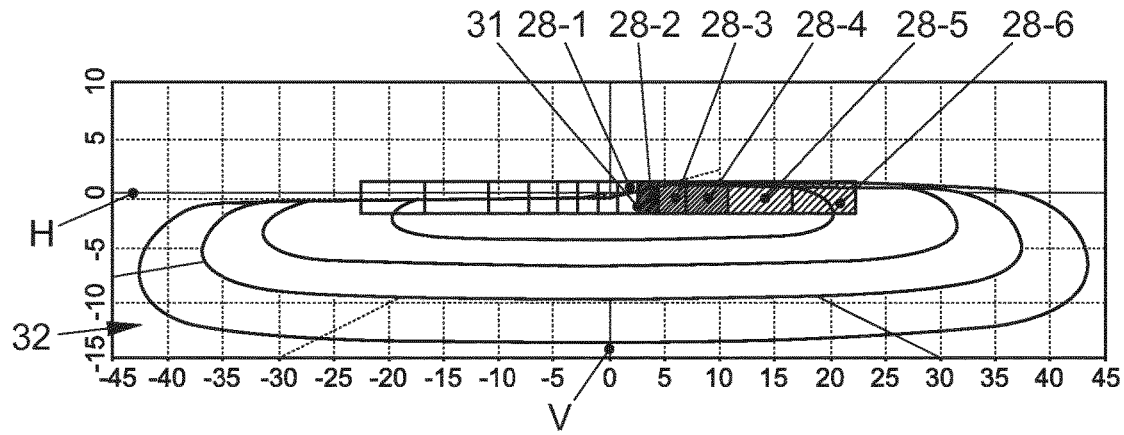
Figure 9C:
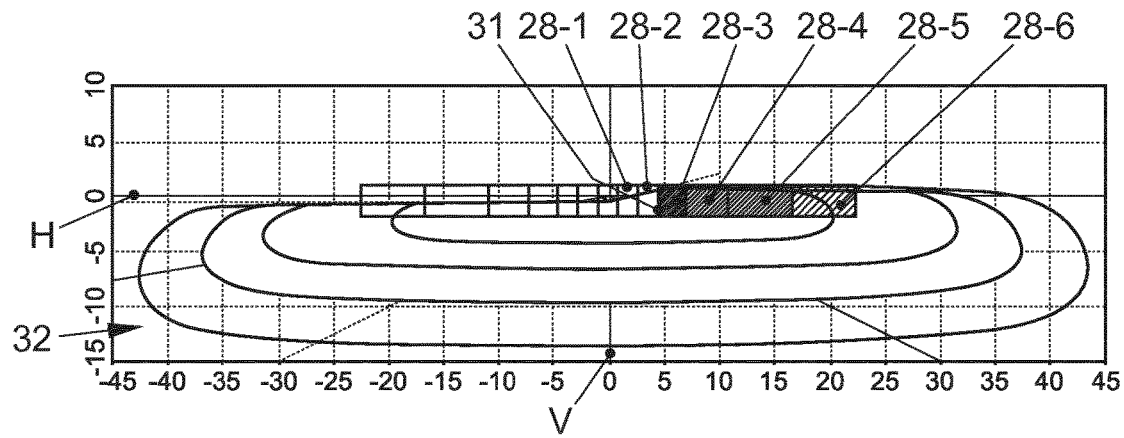
Figure 9D:
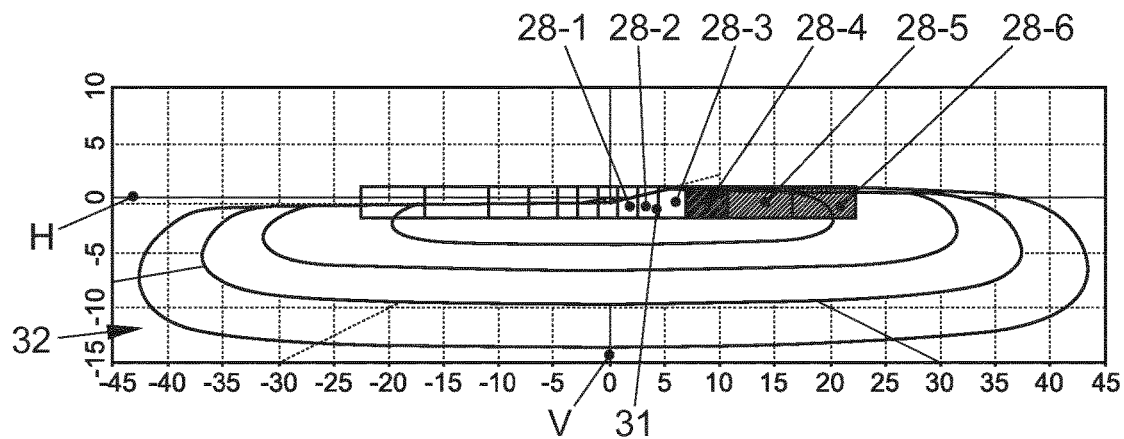
Figure 9E:
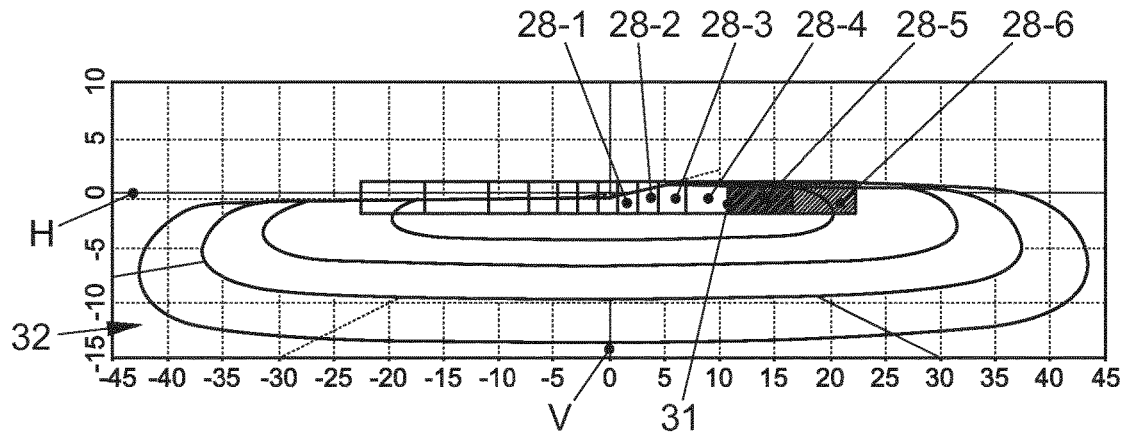

First, geometrical details of light emission by the second light module 4 will be explained with reference to FIG. 8. An axis L parallel to the longitudinal axis of the vehicle 1 runs through the focal point of the second light module 4. From each LED unit 13 of the second light module 4, the illuminated segments 28-1, 28-0 and 28-7 are generated; in this case, the lateral light-dark boundary 31, which is vertical in this exemplary embodiment, is formed from the left-hand segment 28-7. The illuminance in the left segment 28-7 is highest when the illuminance in segment 28-0 is lower and the illuminance in segment 28-1 is even lower. Thus, the maximum light intensity is in segment 28-7. The outermost light beams S1 and S2, which form the segment 28-7 with maximum light intensity, enclose a horizontal angle α; the bisector is the beam H, which in turn encloses an angle β with the longitudinal axis L. The angle β thus indicates where the area with maximum light intensity is located in the horizontal direction, while the angle α indicates how wide this region 28-7 with maximum light intensity is in the horizontal direction. Furthermore, the light beam that forms the lateral light-dark boundary 21 encloses the angle δ with the longitudinal axis L. In the present exemplary embodiment, this beam is the beam S1 on the left side of the segment 28-7 having maximum light intensity.

The control of the total light distribution 32 by means of the control unit 16, when a right-hand bend has been detected by the bend detection unit 19, will be explained with reference to FIGS. 9A to 9E:

The bend detection unit 19 transmits to the control unit 16 a radius of curvature as well as information about where relative to the vehicle 1 the roadway has this curve radius, i.e. whether it is the radius of the curve now being traversed, or a radius of curvature in a lane section ahead of the vehicle 1. The control unit 16 calculates a bending light angle from this. This is the angle δ which the outermost light beam, which forms the lateral light-dark boundary 31 of the light distribution 28 of the second light module 4, encloses together with the longitudinal axis L. This bending light angle δ is determined as a function of the radius of the curve detected by the bend detection unit 19 by means of the control unit 16. As shown in FIGS. 9A to 9E, the lateral light-dark boundary 31 of the light distribution 28, which is superimposed on the light distribution 24 of the asymmetrical low beam, shifts to the right in a right-hand bend, in order to better illuminate the roadway along this bend.

However, the horizontal pivoting of the lateral light-dark boundary 31 does not take place mechanically, but solely through a change in the light intensities emitted by the LED units 13. When the lateral light-dark boundary 31 is pivoted from the initial state shown in FIG. 9A to the state shown in FIG. 9B, the LED unit 13 which illuminates the segment 28-1 is switched off and the light intensities of the LED units 13 that illuminate segments 28-2 and 28-6 are increased. However, the profile of illuminances across segments 28-2 and 28-6 is retained so that the illuminance continues to decrease from the inside to the outside. In this way, the lateral light-dark boundary 31 is pivoted to the position shown in FIG. 9E. In this case, the LED units 13 illuminating segments 28-1 to 28-3 are turned off; the LED unit 13 illuminating segment 28-5 emits light with maximum light intensity; and the LED unit 13 illuminating segment 28-6 emits light with lower light intensity.

Figure 10A:
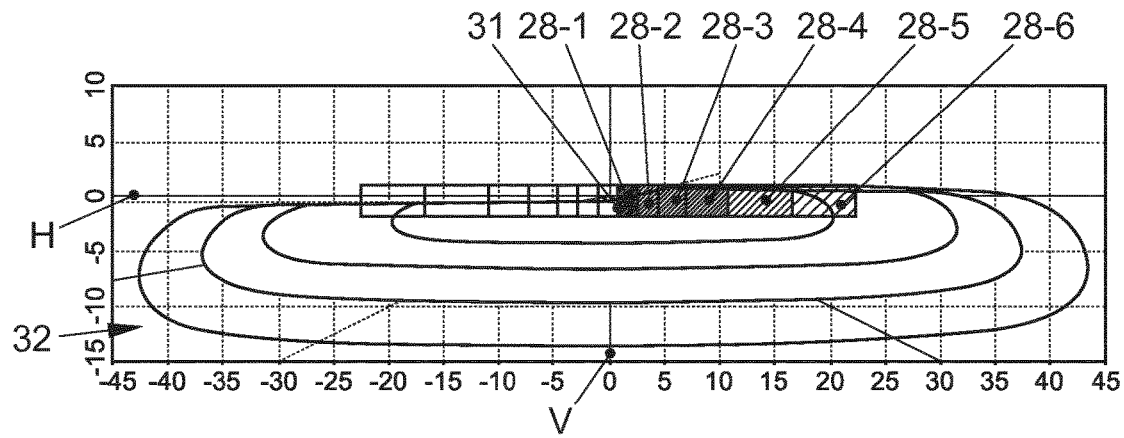
FIGS. 10A to 10G show light distributions of a bending light function in a left-hand bend, which are generated by one exemplary embodiment of the method according to the present invention.
Figure 10B:
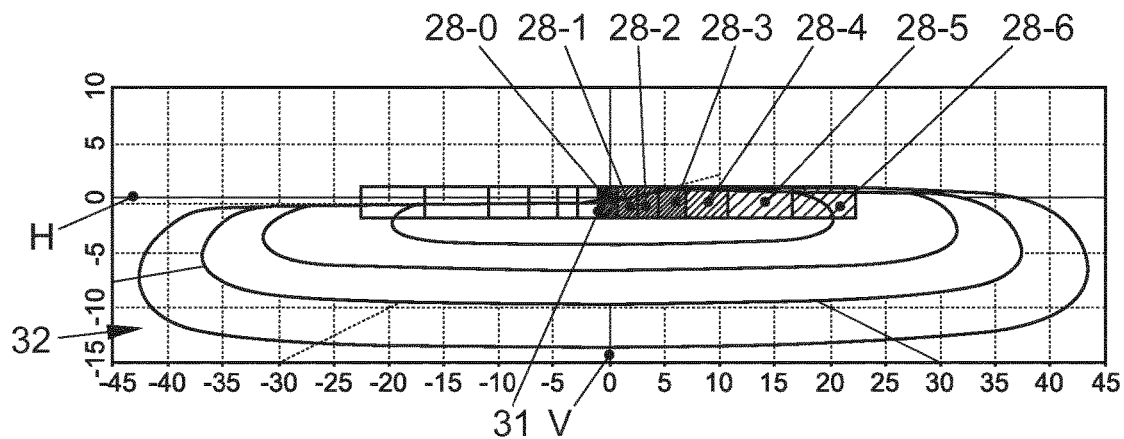
Figure 10C:
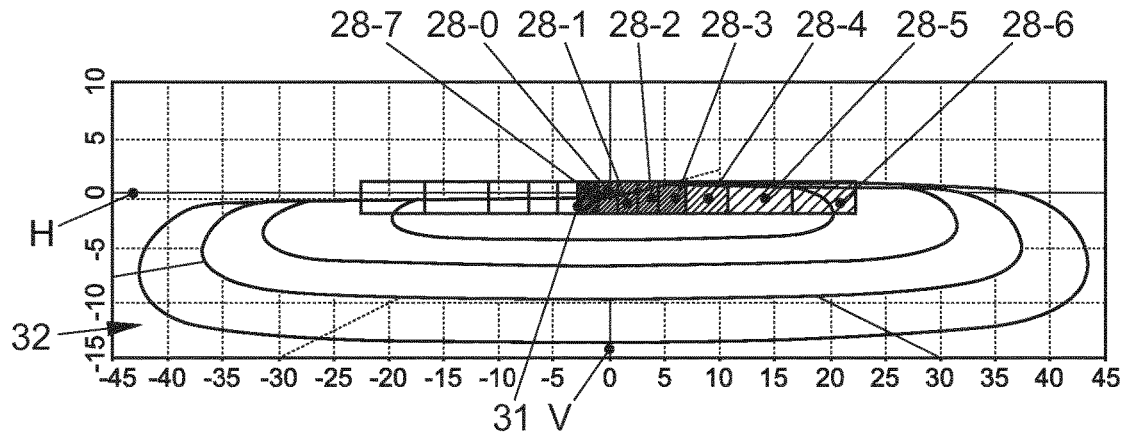
Figure 10D:
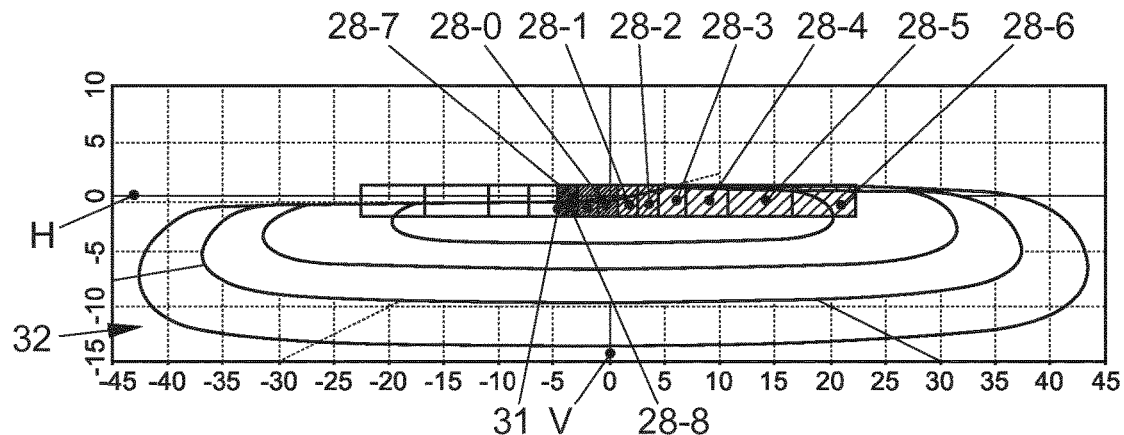
Figure 10E:
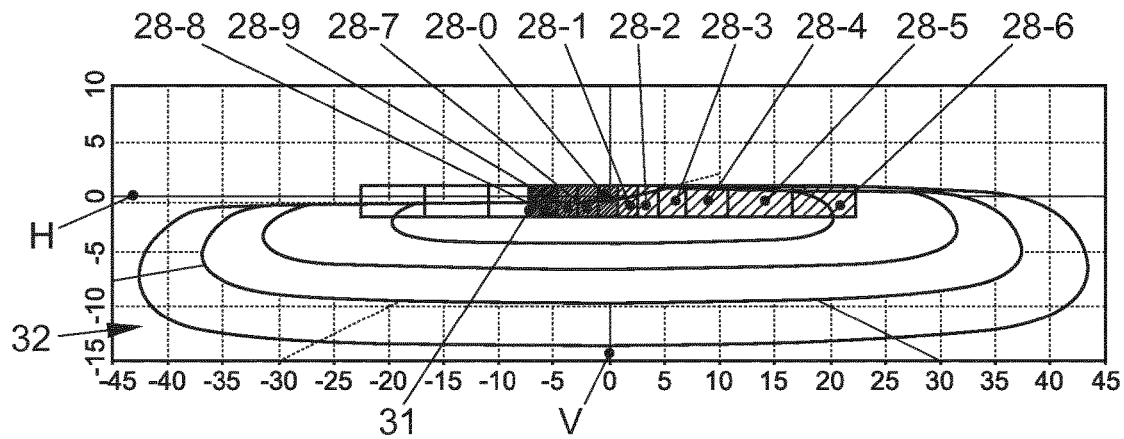
Figure 10F:
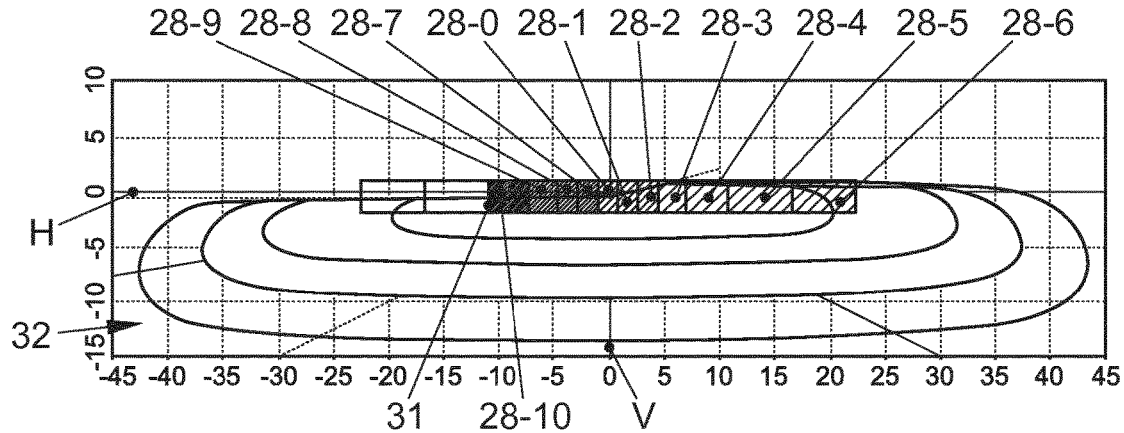
Figure 10G:
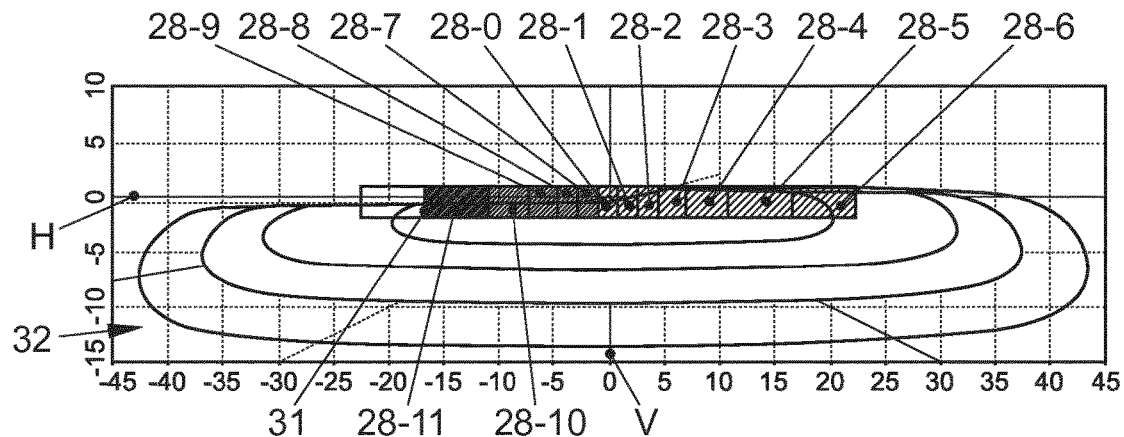

The profile of the total light distribution 32 generated for the bending light function in a left-hand bend will be explained with reference to FIGS. 10A to 10G. In this case, the lateral light-dark boundary 31 is pivoted toward the driver side, i.e. to the left in right-hand traffic. Also in this case, the pivoting of the lateral light-dark boundary 31 is not implemented mechanically, but by changing the light intensities emitted by the LED units 13. For the pivoting of the lateral light-dark boundary 31 to the left, successive further LED units 13 are switched on in order to illuminate the segments 28-0, 28-7, 28-8, 28-9, 28-10 and 28-11, as shown in FIGS. 10B to 10G. At the same time, the light intensity emitted by the other LED units 13 is varied in such a way that with respect to the light distribution 28, which is superimposed on the asymmetrical low beam, an intensity profile results in each case which has a higher illuminance in the outermost section toward the driver side than segments that are arranged further toward the passenger side. In a left-hand bend, the entire width of the section illuminated by the light distribution 28 is thus widened leftward, in the direction of the bend. Further, the more the absolute value of angle δ increases, i.e. the greater the bending light angle by which the lateral light-dark boundary 31 is pivoted in the direction of the bend, the greater the increase in the horizontal angle α for the width of the segment having maximum light intensity. In FIG. 10G, it may be seen that the leftmost illuminated segment 28-11 has the highest illuminance, and that the illuminance of the segments decreases toward the outermost right segment 28-6. In the outer passenger-side segment, the illuminance may also be lowered to zero.

In addition, it is apparent from FIG. 10G that the horizontal angle of segments 28-0 to 28-11 is greatest in the outer regions, and decreases toward the central segment 28-0. The horizontal angle of segments 28-0 to 28-11 is determined by the optical properties of the LED units 13, and in particular is not changeable. In contrast, the illuminance profile across segments 28-0 to 28-11 may be adjusted by means of the control unit 16.

LIST OF REFERENCE SIGNS

1 Vehicle
2 Headlight system
3 First light module
4 Second light module
5 Light source
6 Reflector
7 Projection lens
8 Light cover lens
9 LED matrix
10 Optical element
11 Light cover lens
12-1, 12-2 horizontal lines
13 LED units
14 LED units
15 LED
16 Control unit
17 Data bus
18 Navigation system
19 Bend detection unit
20 Sensor for lateral acceleration
21 Sensor for steering angle
22 Speed sensor
23 Camera
24 Light distribution light-dark boundary

The invention claimed is:

1. A headlight system for a vehicle, the headlight system comprising:
a first light module having a first light source and an optical unit configured to produce an asymmetrical low beam, the asymmetrical low beam, on a driver side of a central axis, having an upper first light-dark boundary extending horizontally;
a second light module having a plurality of LED units arranged in a matrix with no more than two horizontal lines;
a control unit connected to at least said second light module and configured to separately control a light emission of individual said LED units of said second light module; and
a bend detection unit connected to said control unit for detecting a radius of a curve in a direction of travel of the vehicle;
said LED units being disposed to enable generation of a light emission with a radiation characteristic having a lower second light-dark boundary below the first light-dark boundary of the low beam, an upper third light-dark boundary above the first light-dark boundary of the low beam, and a lateral fourth light-dark boundary on the driver side facing a light emission of said second light module;
said control unit, said bend detection unit and said second light module being configured to provide a bending light function with a variable bending light angle, the variable bending light angle being generated by outermost light beams of the light emission of the LED units, which beam generates the lateral fourth light-dark boundary, which encloses a longitudinal axis of the vehicle in the horizontal direction;
wherein the bending light angle depends on the radius of the curve detected by said bend detection unit; and
wherein exactly one horizontal line of said matrix of LED units of said second light module is configured to provide the bending light function, and another of said horizontal lines of said matrix of LED units is configured to provide a high beam function of the headlight system.

2. The headlight system according to claim 1, wherein said LED units of said second light module arranged in the matrix have exactly one horizontal line for providing the bending light function.

3. A method for providing a bending light function for a vehicle, the method comprising:
generating with a first light module an asymmetrical low beam having on a driver side of a central axis an upper first light-dark boundary that is oriented horizontally;
detecting a radius of a curve in a direction of travel of the vehicle;
controlling a second light module having a plurality of LED units arranged in a matrix with at most two horizontal lines to produce a light emission of the LED units having a radiation characteristic with a lower second light-dark boundary below the first light-dark boundary of the low beam, an upper third light-dark boundary above the first light-dark boundary of the low beam, and a lateral fourth light-dark boundary on a side of the light emission of the second light module facing the driver side; and
in order to provide a bending light function, varying a bending light angle that encloses an outermost of the light beams of the light emission of the LED units that generate the lateral fourth light-dark boundary, together with the vehicle longitudinal axis in the horizontal direction; and thereby varying the bending light angle with the radius of the curve in the direction of travel of the vehicle; and
thereby providing the bending light function by way of exactly one horizontal line of the matrix of LED units of the second light module, and providing a high beam function by way of another horizontal line of the matrix of LED units.

4. The method according to claim 3, which comprises controlling the LED units of the second light module in such a way that segments are formed in the horizontal direction with mutually different light intensities, and a horizontal angle of the segments increases inwardly from a side facing the driver side to an opposite side.

5. The method according to claim 3, which comprises controlling the LED units of the second light module in such a way that segments are formed in the horizontal direction with mutually different light intensities, and a horizontal angle of the segments increases outwardly from inside.

6. The method according to claim 3, which comprises controlling the LED units of the second light module in such a way that segments are formed in the horizontal direction with mutually different light intensities, and a light intensity of the segments decreases moving inward from a side facing the driver side to the opposite side.

7. The method according to claim 3, which comprises, depending on the radius of the detected curve, controlling the LED units of the second light module in such a way that there results in the horizontal direction a light intensity profile in which a light intensity is at a maximum in a horizontal angle range and the light intensity is lower in adjacent horizontal angle ranges, and in that the horizontal angle of the horizontal angle range is increased with maximum light intensity when the bending light angle increases enlarged.

8. The method according to claim 7, which comprises controlling the LED units of the second light module in such a way that the lateral fourth light-dark boundary of the horizontal angle range is formed with maximum light intensity.

9. The method according to claim 3, which comprises, if the detecting step indicates that no curve is being traversed, defining the lateral fourth light-dark boundary in a region of a rising light-dark boundary of the asymmetrical low beam on the passenger side.

* * * * *